United States Patent [19]
Mrenna et al.
[11] E Re. 30,862
[45] Reissued Feb. 9, 1982

[54] REJECTION-TYPE FUSE CLIP

[75] Inventors: Stephen A. Mrenna, Beaver; Zelko J. Kruzic, New Brighton, both of Pa.

[73] Assignee: Westinghouse Electric Corp., Pittsburgh, Pa.

[21] Appl. No.: 914,464

[22] Filed: Jun. 12, 1978

Related U.S. Patent Documents

Reissue of:
[64] Patent No.: 3,984,801
Issued: Oct. 5, 1976
Appl. No.: 617,618
Filed: Sep. 29, 1975

[51] Int. Cl.³ ..... H01C 1/02
[52] U.S. Cl. ..... 339/258 R; 339/259 R; 337/252
[58] Field of Search ..... 337/227, 231, 233, 234, 337/236, 237, 248, 251, 252, 260, 261, 225; 339/253 F, 258 F, 259 F

[56] References Cited

U.S. PATENT DOCUMENTS

| | | | |
|---|---|---|---|
| 2,422,589 | 6/1947 | Samzelius | 339/259 F X |
| 2,943,295 | 6/1960 | Stewart | 339/258 F |
| 3,198,913 | 8/1965 | Stanback | 339/258 F X |
| 3,914,005 | 10/1975 | Tillson | 339/258 F X |
| 3,927,929 | 12/1975 | Puetz | 337/225 X |

OTHER PUBLICATIONS

Holding Clip for Special Fuses or Electrical Relays, Page et al., published 3/24/53.

*Primary Examiner*—George Harris
*Attorney, Agent, or Firm*—M. S. Yatsko

[57] ABSTRACT

A fuse clip for cartridge type fuses which permits the insertion of a proper fuse while preventing the insertion of improper fuses. The clip permits the insertion of fuses having an annular groove around one of the end terminals while prohibiting the insertion of fuses without such annular groove. A main body member has a pair of flexible clamping arms which receive the cartridge-type fuse, and the clamping arms have aligned slots therein. A rejection member comprised of a C-shaped configuration, with inward extensions formed on the legs of the C, is inserted into the main body member, with the inward extensions extending through the slots of the clamping arms. The inward extensions are spaced apart a distance greater than the diameter of the annular groove, but less than the diameter of the remainder of the end terminal. The rejection member prevents the insertion of fuses unless an annular groove on the end portion is positioned between the two inward extensions.

3 Claims, 5 Drawing Figures

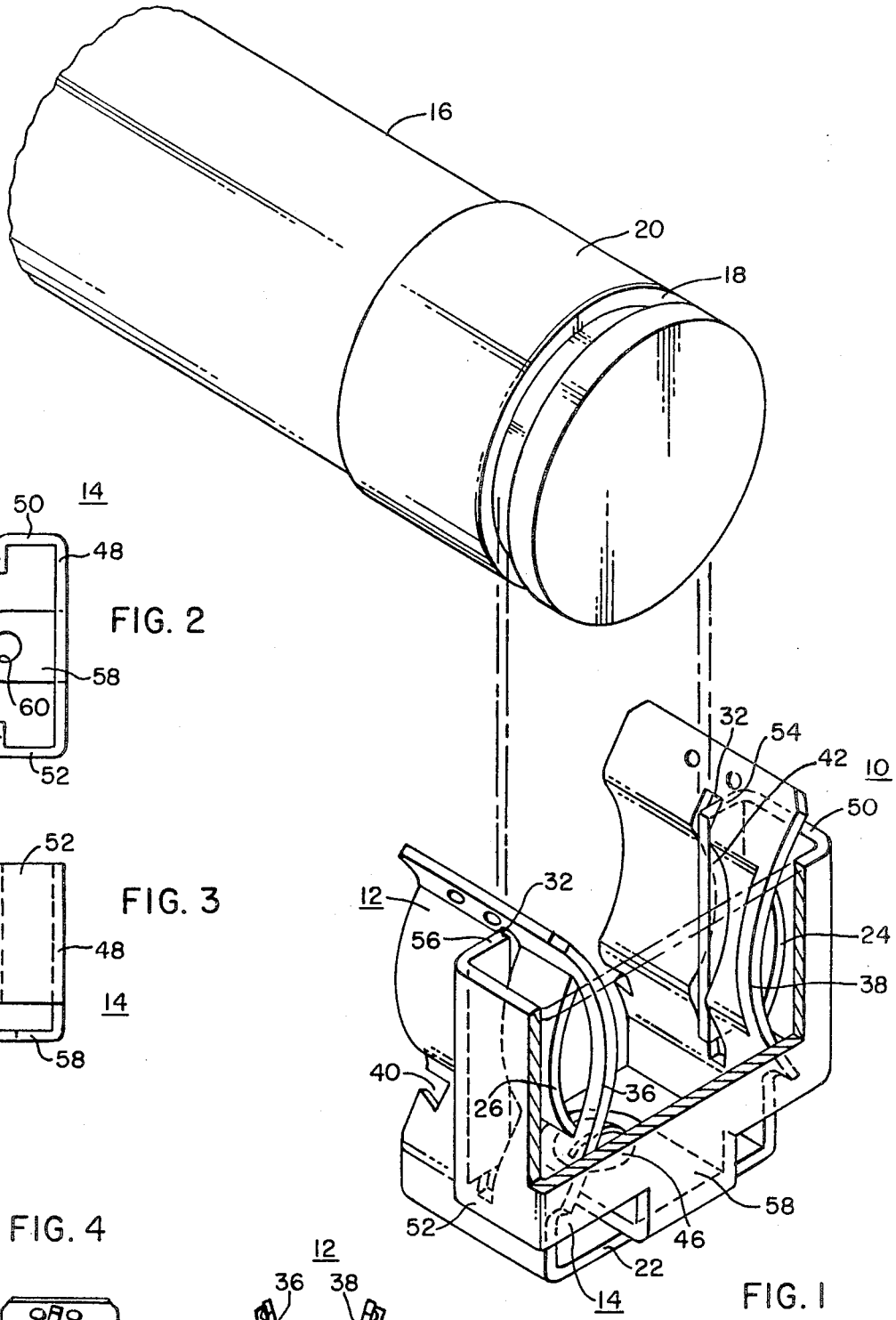
FIG. 1
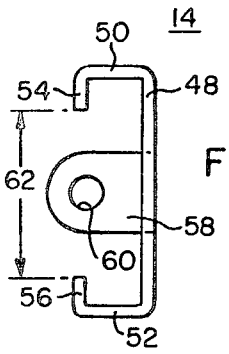
FIG. 2
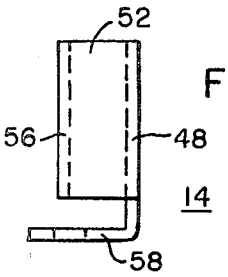
FIG. 3
FIG. 4
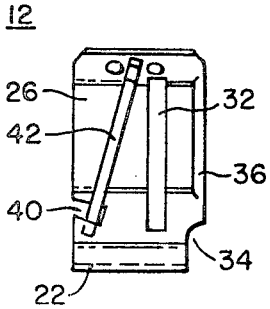
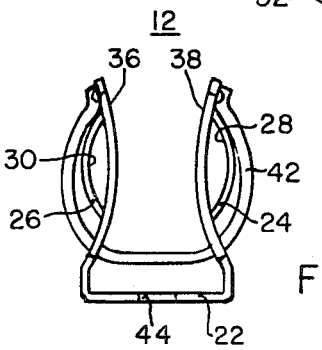
FIG. 5

REJECTION-TYPE FUSE CLIP

Matter enclosed in heavy brackets [ ] appears in the original patent but forms no part of this reissue specification; matter printed in italics indicates the additions made by reissue.

BACKGROUND OF THE INVENTION

This invention relates generally to fuse holders and more particularly to fuse clips incorporating means for preventing insertion of improper fuses.

Fuse clips of the conventional type which include flexible clamping arms for receiving the end terminals of cartridge fuses have the inherent disadvantage of being susceptible to the insertion of fuses having current-interrupting capacities different from the preferred fuse. With a view toward correcting this possibly dangerous situation, some prior fuse clips have been provided with rejection features in the form of interference means for resisting an insertion of such improper fuses. However, the interference means have been formed in the flexible clamping arms of the fuse clip, and the arms, while resisting the insertion of an improper fuse, were susceptible to being overstressed during attempted insertion. Moreover, in some cases, fuse clips which included interference means incorporated within flexible clamping arms could have improper fuses inserted therein, provided sufficient pressure was exerted on the fuse. Therefore, what was needed was an improved rejection means which would resist the insertion of an improper fuse.

Additionally, from an economical standpoint, it is undesirable to manufacture two separate fuse clips; one for fuses having annular grooves therein, and one for fuses without such annular grooves. The interruption of production runs for changeover, and the necessity for adequate inventories, result in unwanted expense for a relatively inexpensive item. Another uneconomical practice resulting from the use of two distinct fuse holders is the requirement that the desired alignment of fuses be known prior to shipment of the assembly of, for example, fuse boxes. This results in additional expense during the fabrication of such items. Therefore, the most desirable practice would be to provide a basic clip which can be utilized with either type fuse, and which can be modified at the point of installation, in the field, by simple and inexpensive means.

One method utilized in the prior art to accomplish these objectives is illustrated in U.S. Pat. No. 2,943,295, issued June 28, 1960. This method utilized openings in the clamping arms of the main fuse clip body, and inserting an interference member between the two clamping arms and extending outwardly beyond them through the openings. This interference member could then be crimped or otherwise secured to the fuse clip body, and would prevent the insertion of improper fuses. However, this invention has its drawbacks in that it is generally necessary to replace the fuse clip in the field, and the field installation is complicated. Another method utilized in the prior art is the use of a retaining clip which fits into the molded casing upon which the fuse clip rests. The retaining clip has an extension which extends into the main fuse clip body between the clamping arms, and prevents the insertion of improper fuses. However, this device has disadvantages in that it can only be utilized in those installations where the molded casing has provisions made therein for the insertion of the retaining clip.

SUMMARY OF THE INVENTION

The aforementioned disadvantages of the prior art are eliminated by this invention by providing a main body member of the fuse clip having generally parallel, flexible clamping arms. A rejection member comprises a generally C-shaped member having inward extensions extending from the arms of the rejection member. These inward extensions extend through aligned slots within the main body clamping arms. The inward extension are spaced apart a distance greater than the diameter of the grooved portion of the fuse end terminal, and a distance less than the diameter of the remainder of the end terminal. By so constructing the rejection member, only those fuses having annular grooves can be inserted into the fuse clip whenever the annular groove is disposed between the two inward extensions and fuses without the annular groove are prevented from being inserted into the fuse clip.

BRIEF DESCRIPTION OF THE DRAWINGS

Reference is now made to the description of the preferred embodiment, illustrated in the accompanying drawings, in which:

FIG. 1 is an isometric view of the fuse clip and fuse utilized in this invention;

FIG. 2 is a plan view of the rejection member;

FIG. 3 is a side view of the rejection member;

FIG. 4 is a side view of the main body member utilized in this invention; and FIG. 5 is an elevational view of the main body member utilized in this invention.

DESCRIPTION OF THE PREFERRED EMBODIMENT

The fuse clip 10 of this invention, as illustrated in FIG. 1, is comprised of a main body member 12 and a rejection member 14. The body member 12 and the rejection member 14 cooperate to permit the insertion of a fuse 16 having an annular groove 18 in its end terminal 20, while prohibiting the insertion of improper fuses not having such an annular groove. An example of the type of fuse 16 which contains the annular groove 18 is that known in the art as a "class R" fuse, while those fuses which do not have the annular groove 18, but instead have smooth barrels at both end terminals are, for example, class H fuses.

Referring now more particularly to FIGS. 4 and 5, showing details of the main body member 12, the main body member 12 comprises a base 22 having spaced, generally parallel flexible clamping arms 24, 26 of a good electrically conducting material such as copper. The clamping arms 24, 26 have opposing contact surfaces 28, 30 for engaging opposite sides of the fuse end terminal 20. The clamping arms 24, 26 have slots 32 therein which are aligned with each other. At one end 34 of the main body member 12 are ribs 36, 38 which provide a stop for the insertion of the fuse 16. If desired, the clamping arms 24, 26 can have notches 40 therein, and a steel spring 42 can be inserted into these notches 40 on the outside of the clamping arms 24, 26. The spring 42, generally of a U-shaped configuration and made of steel, provides tensioning of the clamping arms 24, 26 during insertion and removal of the fuse 16. The base 22 of the main body member 12 has an opening therein 44 for the insertion of a screw 46. The screw 46 can be utilized to secure the main body member 12 to, for example, a case (not shown) in which the fuse is to be mounted. As herein described, the main body member can be utilized for holding either a class R fuse or a class H fuse. To permit the insertion of only class R fuses, the rejection member 14 must be installed.

The rejection member 14 of a metal such as steel, shown in FIGS. 2 and 3, is comprised of a back portion 48 and a pair of spaced, generally parallel rigid holding arms 50, 52 which extend outwardly from the back portion 48 in a generally C-shaped configuration. Each of the holding arms 50, 52 has an inward extension 54, 56 which extends toward the other of the housing arms 50, 52 and generally parallel to the back portion 48. (Another way of describing the configuration would be to consider each holding arm-extension couplet, 50 and 54 and 52 and 56, as L-shaped pieces facing each other and connected by the back portion 48.) The rejection member 14 also includes a support member 58 extending outwardly from the back portion 48 and at right angles to both the back portion 48 and the holding arms 50, 52. The mounting member 58 may have an opening 60 therein for securing the rejection member 14 to the main body member 12.

The inward extensions 54, 56 are spaced apart a distance, designated by the numeral 62, which is substantially equal to, or greater than, the diameter of the end terminal 20 at the location of the annular groove 18. Additionally, this distance 62 is less than the diameter of the remainder of the end terminal 20.

To change the main body member 12 from a unit which will accept end terminals both with and without grooves to a unit which will accept only fuses with grooves, class R fuses, it is necessary only to attach the rejection member 14 to the body member 12. The attachment of these two pieces, which may be accomplished easily at the location of installation, or in the field, is illustrated in FIG. 1. The inward extensions 54, 56 are positioned within the slots 32 of the clamping arms 24, 26. The back portion 48 of the rejection member 14 is positioned adjacent to the ribs 36, 38 of the body member 12. The mounting member 58 of the rejection member 14 is positioned adjacent to, and secured to, the base 22 of the body member 12. This can be accomplished, for example, by aligning the opening 60 of the mounting member 58 and the opening 44 of the base 22 and connecting them by a screw 46. This screw 46 can extend into a structure which supports the fuse 16 and fuse clip 10. To prevent the removal of the rejection member 14 by maintenance personnel if, for example, they have only type H fuses, the screw 46 which secures the rejection member 14 to the main body member 12 can be that known generally as a one-way screw. Once this one-way screw 46 is installed, the two elements 12, 14 are permanently installed and cannot be separated.

When installing a class R fuse, with the annular groove 18, the annular groove 18 is aligned with the inward extensions 54, 56 of the rejection member 14. The fuse 16 is then snapped into place, with the groove 18 fitting between the spaced inward extensions 54, 56, and the remainder of the end terminal 20 exerting pressure against, and remaining in contact with, the flexible clamping arms 24, 26. If it is attempted to insert a fuse not having a groove, such as with a class H fuse, the end terminal of such a fuse, with its constant diameter will be unable to fit in the space 62 between the two inward extensions 54, 56. As these extensions 54, 56, and the holding arms 50, 52 are of a rigid material such as steel, they will not open further to permit the insertion of the class H fuse, and the fuse cannot be inserted into the fuse clip 10.

The field insertion of the rejection member 14 is accomplished quite readily. The existing screw holding the main body member 12 to the support (not shown) is removed, the inward extensions 54, 56 of the rejection member 14 are inserted into the slots 32, a one-way screw 46 is passed through the opening 60 in the supporting member 58, and the opening 44 in the base portion 22, and into the support. The modification of the main body member 12 to a rejection type fuse clip 10 is then complete and permanent.

Thus, it can be seen that this invention provides a simple device for transforming a universal type fuse holder to a class R only fuse holder.

We claim as our invention:

[1. A fuse clip for use with cylindrical cartridge fuses of the type having two end terminals, one of said end terminals having an annular groove therein wherein the diameter of said end at the location of said groove is smaller than the diameter of the remainder of said terminal, said fuse clip permitting the insertion of only those end terminals having said annular groove, said fuse clip comprising:

a main body member including spaced, generally parallel flexible clamping arms having opposing contact surfaces for engaging opposite sides of said end terminal, said clamping arms having aligned slots therein, said body member including a base connecting said clamping arms; and a rejection member comprising a back portion and a pair of spaced, generally parallel rigid holding arms extending outwardly from said back portion in a generally C-shaped configuration, each of said holding arms having an inward extension extending toward the other of said holding arms and generally parallel to said back portion, said inward extensions being positioned in said clamping arm slots, said inward extensions being spaced apart a distance greater than the diameter of said end terminal at the location of said annular groove and a distance less than the diameter of the remainder of said end terminal, whereby said cartridge fuse can be inserted into said fuse clip when said annular groove is positioned between said inward extensions.]

2. [The fuse clip according to claim 1 wherein said rejection member includes] *A fuse clip for use with cylindrical cartridge fuses of the type having two end terminals, one of said end terminals having an annular groove therein wherein the diameter of said end at the location of said groove is smaller than the diameter of the remainder of said terminal, said fuse clip permitting the insertion of only those end terminals having said annular groove, said fuse clip comprising:*

*a main body member including spaced, generally parallel flexible clamping arms having opposing contact surfaces for engaging opposite sides of said end terminal, said clamping arms having aligned slots therein, said body member including a base connecting said clamping arms; and*

*a rejection member comprising a back portion and a pair of spaced, generally parallel rigid holding arms extending outwardly from said back portion in a generally C-shaped configuration, each of said holding arms having an inward extension extending toward*

*the other of said holding arms and generally parallel to said back portion, said inward extensions being positioned in said clamping arm slots, said inward extensions being spaced apart a distance greater than the diameter of said end terminal at the location of said annular groove and a distance less than the diameter of the remainder of said end terminal, whereby said cartridge fuse can be inserted into said fuse clip when said annular groove is positioned between said inward extensions, said rejection member including* a mounting member extending outwardly from said back portion generally at right angles to said back portion and said holding arms, said mounting member being positioned adjacent to, and secured to, said main body member base.

3. The fuse clip according to claim 2 wherein said mounting member and said base have aligned openings therein, and a screw is positioned in said aligned openings, said screw securing said mounting member to said base.

4. The fuse clip according to claim 3 wherein said screw is a one-way screw.

[5. The fuse clip according to claim 1 wherein a generally U-shaped spring is coupled to said clamping arms outward of said clamping arm contact surfaces, said spring providing tensioning of said clamping arms.]

[6. The fuse clip according to claim 5 wherein said spring is of steel.]

[7. The fuse clip according to claim 1 wherein said body member is of copper.]

[8. The fuse clip according to claim 1 wherein said rejection member is of steel.]

* * * * *